Patented Sept. 1, 1931

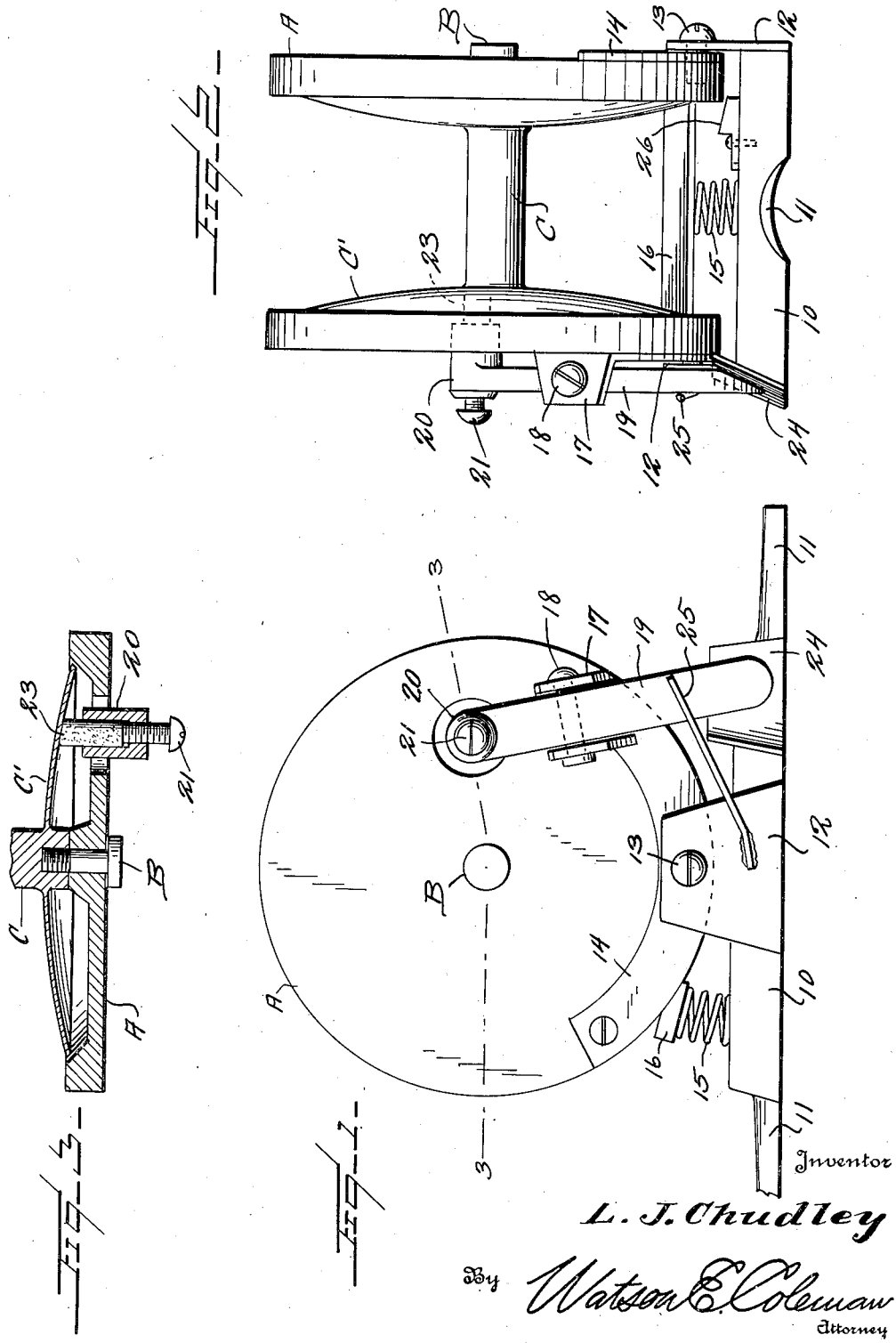

1,821,461

UNITED STATES PATENT OFFICE

LESLIE J. CHUDLEY, OF OCEANSIDE, CALIFORNIA

AUTOMATIC SPOOL CONTROL FOR FISHING REELS

Application filed May 25, 1929. Serial No. 365,928.

This invention relates to fishing reels and particularly to means for preventing back lash.

The general object of my invention is to provide means for controlling the spool of a fishing reel which will automatically prevent back lash of the fishing line as the line is cast and further objects are to provide a device of this character which is not a governor nor which acts as a governor, but which acts as a brake to the spool immediately that the inertia of the line with the sinker thereon is reduced, the mechanism applying this brake upon the spool of the reel so as to prevent the spool from over running.

A further object is to provide mechanism of this character which can be made very small and neat, may be attached to any reel or can be built into the reel as a part thereof when the reel is manufactured.

A further object is to provide means attachable to a casting rod for supporting the reel, which means permits the casing of the reel to swing in one direction when the line is cast and under the pull exerted by the line and a sinker thereon, but which will urge the reel in the opposite direction and cause the automatic application of a brake just as soon as the inertia of the line and sinker is reduced below a suitable point.

Other objects will appear in the course of the following description.

My invention is illustrated in the accompanying drawings, wherein:—

Figure 1 is a side elevation of a fishing reel equipped with my control mechanism;

Figure 2 is an end elevation thereof;

Figure 3 is a section on the line 3—3 of Figure 1.

Referring to the drawings, 10 designates a base which may be made of any suitable material as for instance brass, which is provided with the forwardly and rearwardly extending portions 11 whereby it may be connected to the rod. On each side of the base, there is disposed a flange, bracket or plate 12 through which a screw pin 13 passes.

The reel as illustrated is of any ordinary or usual type, but provided with the side plates A, the spindle B and the spool C operating on this spindle.

Each side plate A is provided with an arcuate plate or band 14 which fits against the lower margin of the side plate and is held thereto by screws or in any other suitable manner. The screw pins 13 pass through these plates or brackets 12 and through the arcuate plates 14 and into the side members A of the reel. The pins 13 thus constitute pivots upon which the reel may rock in one direction or the other. Mounted upon the base 10 adjacent its forward end is a spring 15 which carries upon its upper end a head 16 which pushes the reel upward and backward.

One of the arcuate bands 14 is provided with the outwardly projecting ears 17 through which passes a pivot screw 18 or equivalent member. Mounted upon this pin or screw is a lever or rocker arm 19 which at its upper end has an eye 20 through which passes an adjusting screw 21. Carried upon this adjusting screw is a felt or leather plug 23 projecting therefrom. The screw 21 has screw-threaded engagement with the eye 20 so that the screw may be adjusted in or out to carry the plug 23 which constitutes a brake pad or cushion against the face of one member C' of the reel C. When the lower end of the lever is forced outward, the inner end of the plug 23 is forced against the member C' of the spool and will retard it. Of course, the adjacent side member A of the reel is apertured for the passage of the sleeve 22, the aperture being large enough to permit free movement of the sleeve. The base 10 adjacent its rear end and on one side is formed with the inwardly and upwardly extending portion 24, the face of this portion 24 being not only inclined upward and inward but laterally outward towards its forward end.

A spring 25 attached to the flange or plate 12 bears against the lower end of the lever or rocker arm 19 so as to urge the brake plug 23 away from contact with the spool. A locking member 26 is mounted upon the base to slide back or forth to release or hold the reel from rotation if desired or to permit the spool of the reel to freely rotate.

In the operation of this mechanism, when the line is cast, the spool will rotate in a counterclockwise direction in Figure 1 and the pull of the line will cause the reel casing to rotate upon the pivot pins 13 toward the left in Figure 1 and against the action of the spring 15. So long as the line is paying out under the action of the sinker or the inertia of the line, so long will the reel be swung to the left upon its pivot pins. As soon, however, as the inertia has been reduced beyond a certain point, the spring 15 will act to shift the reel toward the right in Figure 1. This will, of course, shift the arcuate band 14 in the same direction and will cause the lower end of the lever 19 to shift toward the left. As the lower end of the lever 19 shifts toward the left, it will engage against the inclined face of the member 24 which acts as a cam and this will force the upper end of the lever inward carrying the brake plug 23 into contact with the spool, exerting a braking action upon this spool, thus automatically controlling the speed of the spinning spool according to the momentum of the weight of the sinker carrying the line out as it is cast so that as the momentum of the sinker is less, the reel settles back accordingly and the drag becomes greater on the spool accordingly, thus preventing the spool from rotating faster than the line is taken out by the sinker as it is cast and thus preventing any running of the spool and back lash of the line.

It will be seen that this device is a brake and not a governor and is dependent entirely upon the momentum of the line being cast. The device can be made very compactly and neatly and may be attached to any reel or it can be built into the reel when the reel is being manufactured. The base can be made part of the reel if desired.

While I have illustrated certain details of construction and arrangements of parts which I have found to be particularly effective, I do not wish to be limited to this as obviously many minor changes might be made without departing from the spirit of the invention as defined in the appended claims.

I claim:—

1. As an article of manufacture, a brake for fishing reels comprising a base, means for pivotally mounting and supporting the body of the reel upon the base for fore and aft rocking movement, a spring urging the support for the reel rearward upon its pivot, and means acting to frictionally engage the spool of the reel and retard the motion of said spool when the supporting means is urged rearward, the action of said retarding means being relieved when the reel supporting means is urged forward by the casting of a line from the reel.

2. As an article of manufacture, a brake for fishing reels comprising a base, means pivotally mounted upon the base for rocking movement fore and aft, said means supporting a reel body, a spring urging the forward end of said supporting means upward, a braking element carried upon the base and engaging the spool of the fishing reel, means urging the brake into contact with the spool of the reel as the support is tilted rearward, and means urging the brake away from the spool as the support is tilted forward under the action of the pull exerted by a cast line.

3. The combination with a fishing reel having a body and a spool, of a base, means for pivotally supporting the body of the reel upon the base for fore and aft rocking movement, a spring carried upon the base and operatively engaging that portion of the reel forward of the said pivotal axis, a lever mounted upon said supporting means and having a braking portion disposed to engage the spool of the reel, a spring on the base urging the lever in a direction to carry the braking portion away from the spool, and a cam member mounted upon the base and engaging said lever as the reel is tilted rearward upon its pivot to force the braking portion of the lever into engagement with the spool.

4. The combination with a fishing reel having a body and a spool, of a base, means pivotally supporting the reel upon the base for fore and aft rocking movement, a spring disposed forward of the pivot and rocking the reel rearward upon its pivot, a lever pivotally mounted upon the body of the fishing reel and having a brake element adapted to engage against the spool, a spring urging said lever in a direction to carry the brake element away from the spool and a cam member mounted upon the base and operating against one end of the lever to urge the end of the lever carrying the braking element inward against the spool as the reel body is tilted rearward.

5. The combination with a fishing reel having a body and a spool, of a base having upwardly extending flanges or ears, arcuate members attached to the body of the fishing reel and pivotally engaged with said ears whereby the body of the fishing reel may rock longitudinally in a vertical plane, one of said arcuate elements at its rear end having outwardly projecting ears, a lever pivotally mounted between said ears the inner end of the lever having an inwardly extending braking element adapted to pass through the body of the reel and engage the spool thereof, a spring urging the outer end of the lever inward to thus release the braking element from contact with the spool, a cam formed upon the base and engageable with the outer end of said lever to force the outer end laterally outward as the arcuate element is rocked in a rearward direction upon the base, and a spring urging the forward ends of the arcuate elements and the body of the reel upward to thus cause the application of the brake when the drag of a cast line has been reduced.

6. The combination with a reel body and a spool operating therein, the reel body being apertured, of a braking member comprising a lever having an eye at one end and an adjusting screw passing therethrough and passing through the aperture in the reel body, a friction plug carried by the screw and engageable with the spool, means for supporting the reel body for forward and rearward tilting movement, means urging the reel body rearward, and means causing inward movement of the brake element carrying end of the lever toward the spool upon the rearward movement of the reel body and causing the retraction of the brake carrying end of the lever upon a forward movement of the reel body due to the momentum of a cast line.

7. The combination with a fishing reel having a body and a spool, the body including the side plates, of a base having means whereby it may be attached to a fishing pole, a member attached to one of the side plates of the body of the reel and pivotally supported upon said base for rocking movement forward and rearward, a spring carried by the base and engaging the body of the reel, and urging the forward end of said body upward, a lever pivotally mounted upon said member and having a braking element at its inner end and engageable with the spool, one side plate of the body having an opening through which the braking element extends, the base being formed with a cam over which the other end of said lever extends, a spring urging the outer end of the lever against said cam, the cam being inclined in a direction to cause the outer end of the lever to move laterally outward, and the braking element to move inward against the spool when the reel supporting member is tilted downward at its rear end by said spring.

In testimony whereof I hereunto affix my signature.

LESLIE J. CHUDLEY.